(12) United States Patent
Asnaashari et al.

(10) Patent No.: US 10,037,272 B2
(45) Date of Patent: Jul. 31, 2018

(54) STORAGE SYSTEM EMPLOYING MRAM AND ARRAY OF SOLID STATE DISKS WITH INTEGRATED SWITCH

(71) Applicant: Avalanche Technology, Inc., Fremont, CA (US)

(72) Inventors: Mehdi Asnaashari, Danville, CA (US); Siamack Nemazie, Los Altos Hills, CA (US); Anilkumar Mandapuram, San Jose, CA (US)

(73) Assignee: Avalanche Technology, Inc., Fremont, CA (US)

( * ) Notice: Subject to any disclaimer, the term of this patent is extended or adjusted under 35 U.S.C. 154(b) by 0 days.

(21) Appl. No.: 13/831,921

(22) Filed: Mar. 15, 2013

(65) Prior Publication Data

US 2014/0047166 A1 Feb. 13, 2014

Related U.S. Application Data

(63) Continuation-in-part of application No. 13/769,710, filed on Feb. 18, 2013, and a continuation-in-part of application No. 13/745,686, filed on Jan. 18, 2013, and a continuation-in-part of application No. 13/673,866, filed on Nov. 9, 2012, and a continuation-in-part of application No. 13/570,202, filed on Aug. 8, 2012.

(51) Int. Cl.
*G06F 12/00* (2006.01)
*G06F 12/02* (2006.01)

(52) U.S. Cl.
CPC .. *G06F 12/0246* (2013.01); *G06F 2212/7201* (2013.01); *G06F 2212/7207* (2013.01)

(58) Field of Classification Search
CPC ...... G06F 12/06; G06F 11/20; G06F 11/2005; G06F 12/201; G06F 11/2092; G06F 11/2094; G06F 12/0246; G06F 11/1441; G06F 2212/1032; G06F 2212/2022
USPC ........................................................ 711/103
See application file for complete search history.

(56) References Cited

U.S. PATENT DOCUMENTS

7,904,629 B2 *   3/2011   Daniel ............... G06F 13/4022
                                                      710/306
8,205,034 B2 *   6/2012   Matsumoto et al. ......... 711/103
(Continued)

*Primary Examiner* — Matthew Bradley
(74) *Attorney, Agent, or Firm* — Maryam Imam; Bing K. Yen (57) ABSTRACT

A storage system includes a central processing unit (CPU) subsystem including a CPU, a physically-addressed solid state disk (SSD) that is addressable using physical addresses associated with user data, provided by the CPU, to be stored in or retrieved from the physically-addressed SSD in blocks. Further, the storage system includes a non-volatile memory module, the non-volatile memory module having flash tables used to manage blocks in the physically addressed SSD, the flash tables include tables used to map logical to physical blocks for identifying the location of stored data in the physically addressed SSD. Additionally, the storage system includes a peripheral component interconnect express (PCIe) switch coupled to the CPU subsystem and a network interface controller coupled through a PCIe bus to the PCIe switch, wherein the flash tables are maintained in the non-volatile memory modules thereby avoiding reconstruction of the flash tables upon power interruption.

25 Claims, 8 Drawing Sheets

(56) References Cited

U.S. PATENT DOCUMENTS

2007/0033431 A1* 2/2007 Pecone et al. .................... 714/6
2009/0172257 A1* 7/2009 Prins ................... G06F 13/1657
　　　　　　　　　　　　　　　　　　　　　711/103

* cited by examiner

STORAGE SYSTEM EMPLOYING MRAM AND ARRAY OF SOLID STATE DISKS WITH INTEGRATED SWITCH

CROSS REFERENCE TO RELATED APPLICATIONS

This application is a continuation-in-part of U.S. patent application, filed on Ser. No. 13/769,710, on Feb. 19, 2013, by Siamack Nemazie, which is a continuation-in-part of U.S. patent application Ser. No. 13/745,686, filed on Jan. 18, 2013, by Siamack Nemazie and entitled "Physically Addressed Solid State Disk Employing MRAM", which is a continuation-in-part of U.S. patent application Ser. No. 13/673,866, filed on Nov. 9, 2012, by Siamack Nemazie and entitled "SYSTEM EMPLOYING MARAM AND PHYSICALLY ADDRESSED SOLID STATE DISK", which is a continuation-in-part of U.S. patent application Ser. No. 13/570,202, filed on Aug. 8, 2012, by Siamack Nemazie and Ngon Van Le, and entitled "SOLID STATE DISK EMPLOYING FLASH AND MAGNETIC RANDOM ACCESS MEMORY (MRAM)", which claims priority U.S. Provisional Application No. 61/538,697, filed on Sep. 23, 2011, entitled "Solid State Disk Employing Flash and MRAM", by Siamack Nemazie, incorporated herein by reference as though set forth in full.

BACKGROUND OF THE INVENTION

Field of the Invention

This invention relates generally to storage systems, and particularly to storage systems utilizing physically-addressed solid state disk (SSD).

Background

Solid State Drives (SSDs) using flash memories have become a viable alternative to Hard Disc Drives (HDDs) in many applications. Such applications include storage for notebook, tablets, servers and network-attached storage appliances. In notebook and tablet applications, storage capacity is not too high, and power and or weight and form factor are key metric. In server applications, power and performance (sustained read/write, random read/write) are key metrics. In network-attached storage appliances, capacity, power, and performance are key metrics with large capacity being achieved by employing a number of SSDs in the appliance. SSD may be directly attached to the system via a bus such as SATA, SAS or PCIe.

Flash memory is a block-based non-volatile memory with each block organized into and made of various pages. After a block is programmed into the flash memory, it must be erased prior to being programmed again. Most flash memory require sequential programming of pages within a block. Another limitation of flash memory is that blocks can only be erased for a limited number of times, thus, frequent erase operations reduce the life time of the flash memory. A flash memory does not allow in-place updates. That is, it cannot overwrite existing data with new data. The new data are written to erased areas (out-of-place updates), and the old data are invalidated for reclamation in the future. This out-of-place update causes the coexistence of invalid (i.e. outdated) and valid data in the same block.

Garbage Collection (GC) is the process to reclaim the space occupied by the invalid data, by moving valid data to a new block and erasing the old block. But garbage collection results in significant performance overhead as well as unpredictable operational latency. As mentioned, flash memory blocks can be erased for a limited number of times.

Wear leveling is the process to improve flash memory lifetime by evenly distributing erases over the entire flash memory (within a band).

The management of blocks within flash-based memory systems, including SSDs, is referred to as flash block management and includes: Logical to Physical Mapping; Defect management for managing defective blocks (blocks that were identified to be defective at manufacturing and grown defective blocks thereafter); Wear leveling to keep program/erase cycle of blocks within a band; Keeping track of free available blocks; and Garbage collection for collecting valid pages from a number of blocks (with a mix of valid and invalid page) into one block and in the process creating free blocks are examples of block management required to effectuate writing and programming of flash memory. Flash block management requires maintaining various tables referred to as flash block management tables (or "flash tables"). These tables are generally proportional to the capacity of SSD.

Generally, the flash block management tables can be constructed from metadata maintained on flash pages. Metadata is non-user information written on a page. Such reconstruction is time consuming and generally performed very infrequently upon recovery during power-up from a failure (such as power fail). In one prior art technique, the flash block management tables are maintained in a volatile memory, and as mentioned, the flash block management tables are constructed from metadata maintained in flash pages during power-up. In another prior art technique, the flash block management tables are maintained in a battery-backed volatile memory, utilized to maintain the contents of volatile memory for an extended period of time until power is back and tables can be saved in flash memory. In yet another prior art technique, the flash block management tables are maintained in a volatile random access memory (RAM), the flash block management tables are periodically and/or based on some events (such as a Sleep Command) saved (copied) back to flash, and to avoid the time consuming reconstruction upon power-up from a power failure additionally a power back-up means provides enough power to save the flash block management tables in the flash in the event of a power failure. Such power back-up may comprise of a battery, a rechargeable battery, or a dynamically charged super capacitor.

Flash block management is generally performed in the solid state drive (SSD) and the tables reside in the SSD. Alternatively, the flash block management may be performed in the system by a software or hardware, commands additionally include commands for flash management commands and the commands use physical addresses rather than logical addresses. An SSD with commands using physical addresses is referred to as Physically-Addressed SSD. The flash block management tables are maintained in the (volatile) system memory.

A storage system (also referred to as "storage array", or "storage appliance") is a special purpose computer system attached to a network, dedicated to data storage and management. The storage system may be connected to Internet Protocol (IP) Network running Network File System (NFS) protocol or Common Internet File System (CIFS) protocol or Internet Small Computer System (iSCSI) protocol or to a Storage Area Network (SAN) such as Fiber Channel (FC) or Serial Attached SCSI (SAS) for block storage.

These storage systems typically provide one or two network ports and one or more external network switches are required to connect multiple hosts to such systems. External network switches are costly and take rack space in the space constraint data centers.

There are also substantial latencies and processing associated with the above mentioned protocols which makes the storage system slow to respond.

In a storage system employing physically-addressed SSD which maintains the flash block management tables on the system memory that has no power back-up means for the system and no power back-up means for the system memory, the flash block management tables that reside in the system memory are lost and if copies are maintained in the flash onboard the SSD, the copies may not be updated and/or may be corrupted if power failure occurs during the time a table is being saved (or updated) in the flash memory.

Hence, during a subsequent power up, during initialization, the tables have to be inspected for corruption due to power fail and, if necessary, recovered. The recovery requires reconstruction of the tables to be completed by reading metadata from flash pages and results in further increase in delay for system to complete initialization. The process of complete reconstruction of all tables is time consuming, as it requires metadata on all pages of SSD to be read and processed to reconstruct the tables. Metadata is non-user information written on a page. This flash block management table recovery, during power-up, further delays the system initialization, the time to initialize the system is a key metric in many applications.

Yet another similar problem of data corruption and power fail recovery arises in SSDs and also Hard Disc Drives (HDDs) when write data for write commands (or queued write commands when command queuing is supported) is cached in a volatile system memory and command completion issued prior to writing to media (flash or HDD). It is well known in the art that caching write data for write commands (or queued write commands when command queuing is supported) and issuing command completion prior to writing to media significantly improves performance.

Additionally, file systems and storage systems employ journaling or logging for error recovery, the journal or log associated with a command or commands is saved in a persistent storage. In the event of a power fail or system crash or failure, the journal or log is played back to restore the system to a known state.

As mentioned before, in some prior art techniques, a battery-backed volatile memory is utilized to maintain the contents of volatile memory for an extended period of time until power returns and tables can be saved in flash memory.

Battery backup solutions for saving system management data or cached user data during unplanned shutdowns are long-established but have certain disadvantage including up-front costs, replacement costs, service calls, disposal costs, system space limitations, reliability and "green" content requirements.

What is needed is a system employing physically-addressed SSD to reliably and efficiently preserve flash block management tables in the event of a power interruption as well as having a low latency and supporting number of hosts.

SUMMARY OF THE INVENTION

Briefly, a storage system includes a central processing unit (CPU) subsystem including a CPU, a physically-addressed solid state disk (SSD) that is addressable using physical addresses associated with user data, provided by the CPU, to be stored in or retrieved from the physically-addressed SSD in blocks. Further, the storage system includes a non-volatile memory module, the non-volatile memory module having flash tables used to manage blocks in the physically addressed SSD, the flash tables include tables used to map logical to physical blocks for identifying the location of stored data in the physically addressed SSD. Additionally, the storage system includes a peripheral component interconnect express (PCIe) switch coupled to the CPU subsystem and a network interface controller coupled through a PCIe bus to the PCIe switch, wherein the flash tables are maintained in the non-volatile memory modules thereby avoiding reconstruction of the flash tables upon power interruption.

These and other objects and advantages of the invention will no doubt become apparent to those skilled in the art after having read the following detailed description of the various embodiments illustrated in the several figures of the drawing.

DETAILED DESCRIPTION OF VARIOUS EMBODIMENTS

Figure 1:
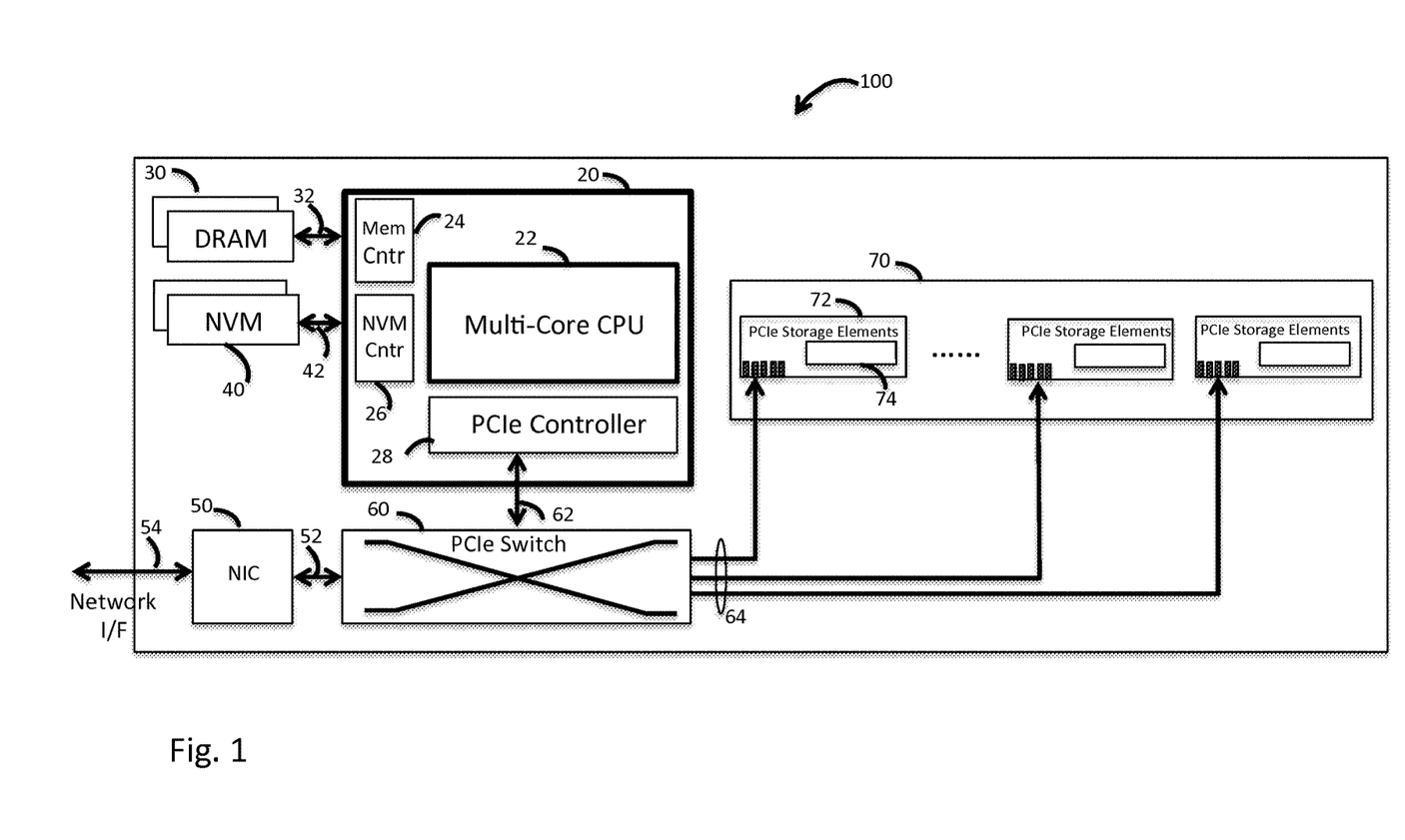
FIG. 1 shows a storage system 100 is shown, in accordance with an embodiment of the invention.

Referring now to FIG. 1, a storage system 100 is shown, in accordance with an embodiment of the invention. The system 100 is shown to include a Central Processor Unit (CPU) subsystem 20 (also known herein as "processor" or "host"), a system memory 30, a non-volatile memory (NVM) module 40, and a bank of physically-addressed solid state disks (SSD) 70, in accordance with an embodiment of the invention. A "Bank", as used herein, refers to one or more.

The CPU subsystem 20 of system 100 is shown to include a multi-core CPU 22, a memory controllers 24 shown coupled to a memory bus 32 to the memory 30, a PCIe controller 28, an NVM controller 26 shown coupled to NVM module 40. The NVM module 40 is shown coupled to the NVM controller 26 of CPU subsystem 20 through a NVM bus 42. The memory 30 is shown coupled to the memory controllers 24 through memory bus 32.

The system 100 further includes a network interface controller (NIC) 50 and a peripheral component interconnect express bus (PCIe) switch 60. The NIC 50 is shown coupled through a PCIe bus 52 and network interface 54 for connection to the network. The PCIe switch 60 is shown coupled to the PCIe controller 28 of the CPU subsystem 20 through a PCIe bus 62.

The NIC 50 is shown to receive input through the network interface 54.

The storage array 70 is shown to include a bank of storage array elements 72. Each storage array element 72 is shown to include a bank of flash memories 74 and connects to the PCIe switch 60 through the PCIe bus 64.

The NIC 50 includes circuitry required to communicate with a specific physical layer and data link layer for receiving and transmitting information packets including command/status and data, as is known to those in the industry. The NIC 50 further includes circuitry required for communicating with upper layer protocols (layer above data link layer, such as transport layer, application layer, . . . ), as is also known in the industry.

In some embodiments, the network interface 54 is a Gigabit or ten Gigabit Ethernet running Internet Small Computer System Interface (iSCSI) and in other embodiments, it is a Serial Attached SCSI (SAS) or Fiber Channel (FC), which are generally used with block storage protocols. In yet other embodiments, the network interface 52 is Gigabit or ten Gigabit Ethernet running network file storage (NFS) protocol. All of the foregoing interfaces are known in the art. In particular the Ethernet capabilities are either integrated into the CPU subsystem 20 or implemented via a low-cost dedicated NIC 50, connected directly to CPU subsystem 20 or through the PCIe switch 60 and PCIe bus 62 to CPU subsystem 20 as shown in FIG. 1.

In operation, a network switch is connected to the NIC 50 through the network interface 54. Multiple hosts can utilize the storage system 100 to perform read and write operations through the network switch. The NIC 50 receives commands from different hosts and directs them to the CPU subsystem 20. The CPU subsystem 20 processes commands received by the NIC 50 through the network interface 54 from the network switch and their associated payload; creates new commands and data structures required by storage array elements 72 of storage array 70 in the DRAM module 30 and the NVM module 40; and notifies the storage array elements 72 of storage array 70 accordingly. Each storage array element 72 independently communicates with the PCIe controller 28 of the CPU subsystem 20 through the PCIe switch 60 via the PCIe busses 64 and 62 to retrieve their command and data structures. Once the storage array elements 72 have processed and completed their commands, they send completion status to the CPU subsystem 20. The CPU subsystem 20 collects the completion status from all the storage array elements 72 and formulates status corresponding to the host commands.

In some embodiment, the PCIe switch 60 may be integrated into the PCIe controller 28 or the NIC 50 may be coupled directly to the CPU subsystem 20. In other embodiment, the PCIe switch 60 may include multiple and cascaded PCIe switches to provide the fan-out required by the storage system 100. By expanding the number of PCIe ports and PCIe lanes, the storage system can supports many physically-addressed SSD to provide the large storage capacities required for these class of systems. If the storage system lacks the number of PCIe ports and PCIe lane to support the required capacity, it will make such system disadvantageously smaller in capacity than desired.

Figure 2:
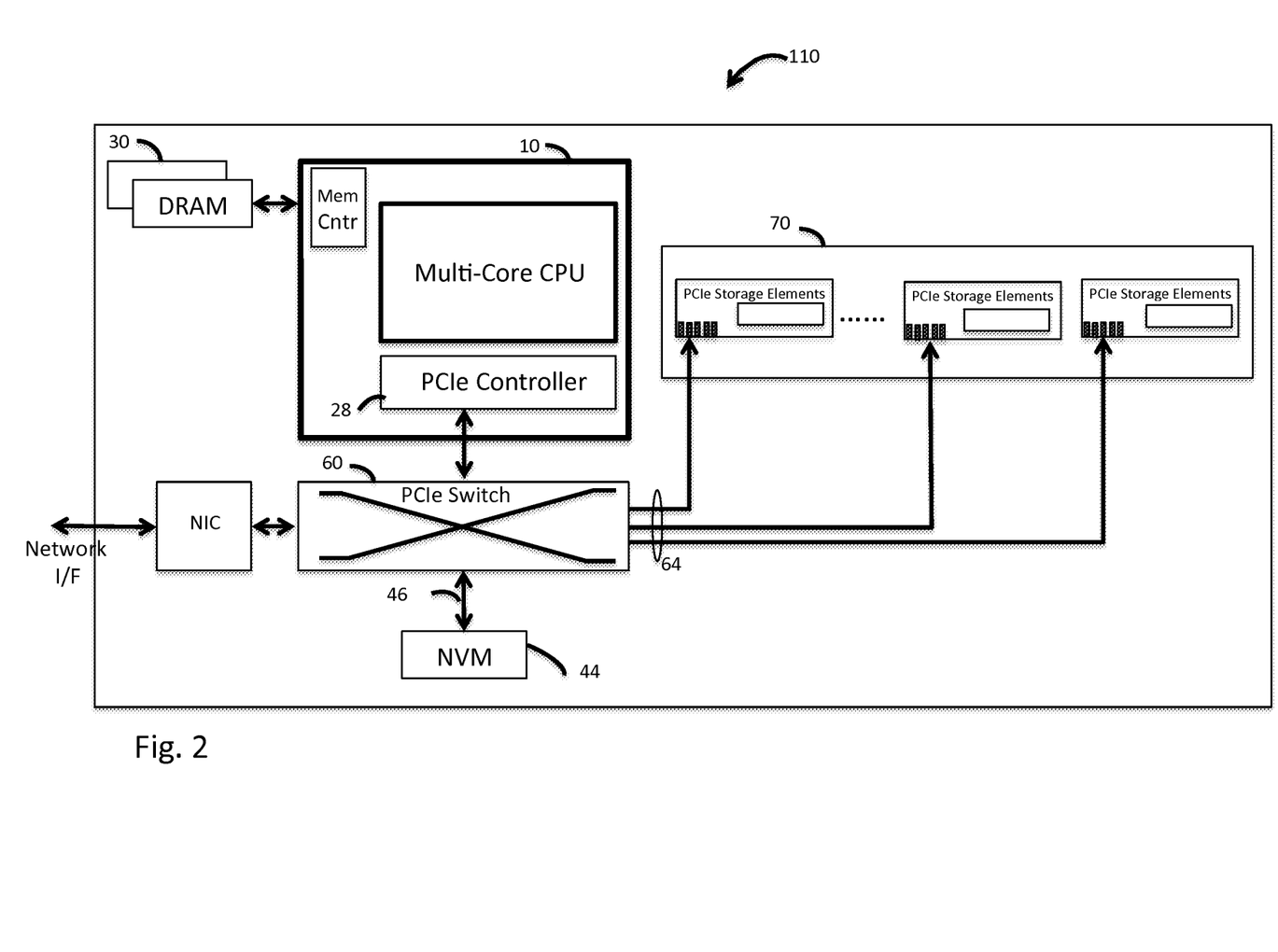
FIG. 2 shows a storage system 110, in accordance with another embodiment of the invention.

Referring now to FIG. 2, a storage system 110 is shown in accordance with another embodiment of the invention. The storage system 110 is analogous to the storage system 100 of FIG. 1 except that the NVM module 44 is shown coupled to the PCIe switch 60 through the PCIe bus 46 in the embodiment of FIG. 2 whereas in storage system 100, the NVM module 40 is shown coupled to the NVM controller 26 of the CPU subsystem 20. In the storage system 110, operationally, the system 100 and 110 behave analogously with the exception of the manner in which the NVM module 44 is accessed by the CPU subsystem 20. That is, in the storage system 100, CPU subsystem 20 accesses the NVM module 40 through the NVM bus 42 whereas in the storage system 110, the CPU subsystem 10 accesses the NVM module 44 through the PCIe switch 60 and the PCIe controller 28.

Figure 3:
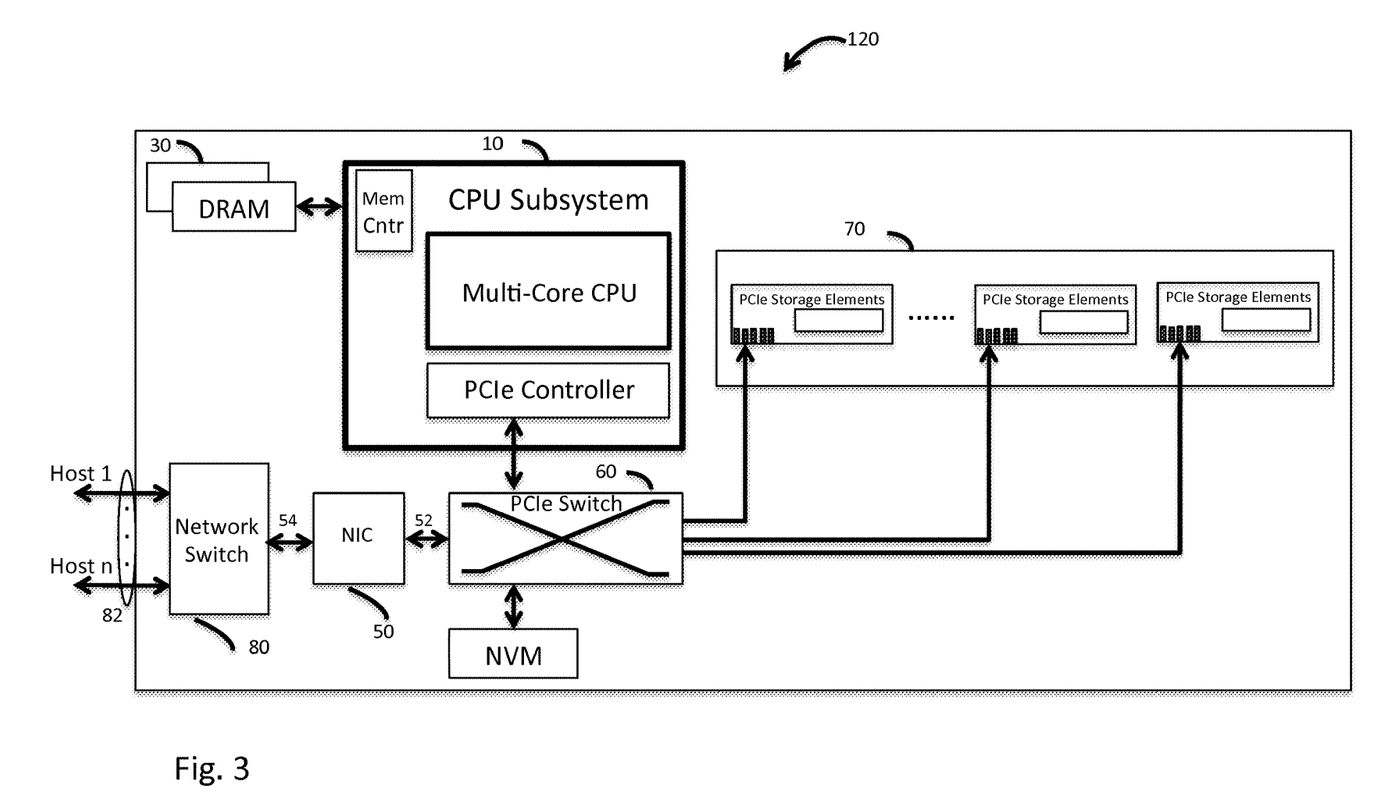
FIG. 3 shows a storage system 120, in accordance with yet another embodiment of the invention.

Referring now to FIG. 3, a storage system 120 is shown in accordance with yet another embodiment of the invention. The storage system 120 is analogous to the storage system 110 of FIG. 2 except that the storage system 120 further includes a network switch 80 coupled to the NIC 50 through the network interface 54 and host 1 through host 'n' are coupled to the network switch 80 through the network interfaces 82 with 'n' being an integer value. The embodiment of FIG. 3 allows host 1 through host 'n' to be directly connected to the storage system 120 therefore eliminating the need for an external expensive high speed Ethernet network switch. Integrating the network switch into the storage system will improve the storage rack utilization and cost associated with implementing optimized data centers.

Figure 4:
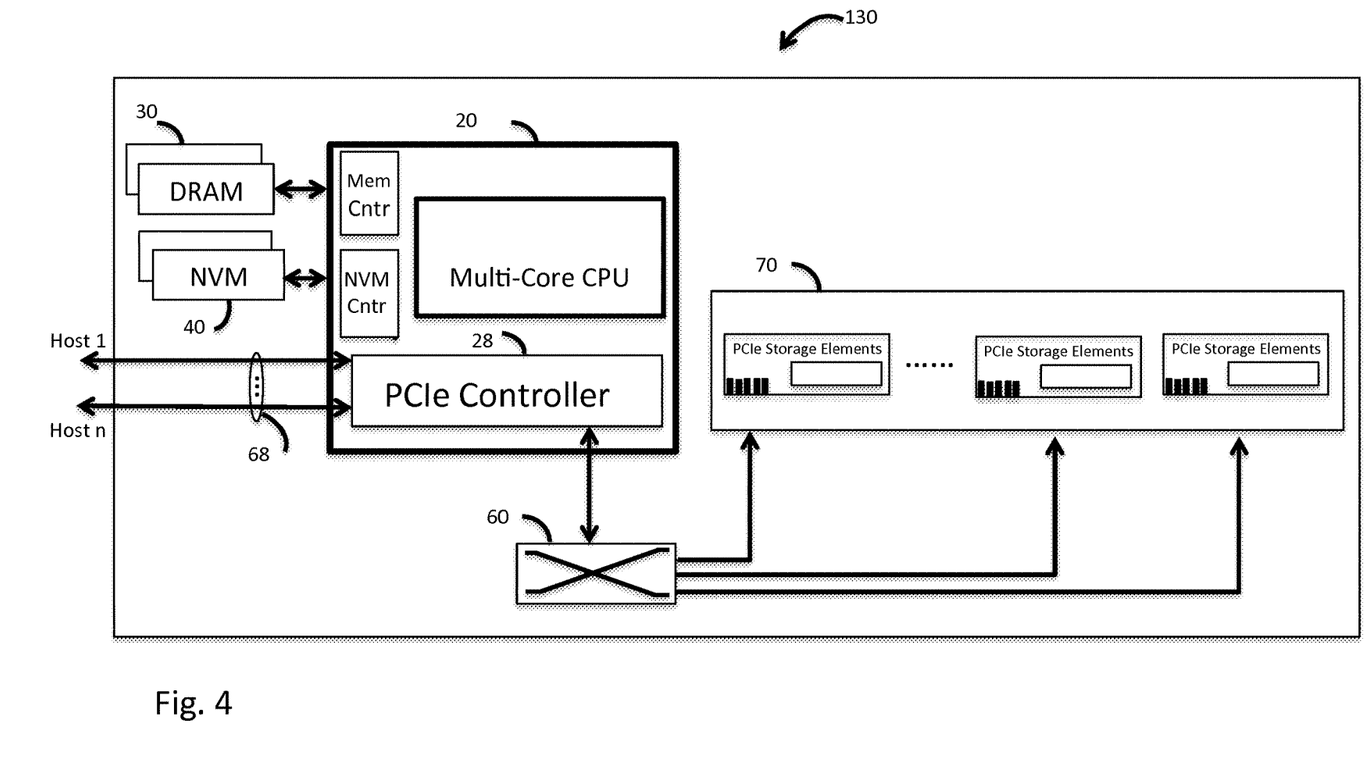
FIG. 4 shows a storage system 130, in accordance with an embodiment of the invention.

Referring now to FIG. 4, a shared PCIe based storage system 130 is shown in accordance with an embodiment of the invention. Storage system 130 is analogous to the storage system 100 of FIG. 1 except that the storage system 130 lacks the NIC 50 and network interface 54. In this embodiment, the host 1 through the host 'n' communicate directly with the PCIe controller 28 of CPU subsystem 20 via PCIe busses 68 and therefore eliminating the cost and latency associated with the NIC controller 50 of the embodiment of FIG. 1.

There are substantial amount of latencies and processing associated with the protocols used in NIC based storage system which makes such storage storage system slow to respond. To avoid these latencies, a shared PCIe based storage system provides PCIe ports as means for direct connections to network of hosts via PCIe cables and therefore bypasses the software stacks and protocol processing associated with use of NIC. The shared PCIe based storage system provides a high speed and high performance, sharing infrastructure using existing protocols such as non-volatile memory express (NVMe).

The shared PCIe based storage system looks like an individual direct attached storage (DAS) to each host without the limitation of DAS. DAS as well known in the industry is dedicated to the server that is installed in and can't be shared with other servers. It also means potential waste of resource when the entire capacity of the DAS is not required by that server. The shared PCIe based storage system solves these problems by providing a shared storage among the network of hosts. The storage system management tools will allocate storage to each host based on their requirements and more importantly, files across the network hosts can be shared.

Figure 5:
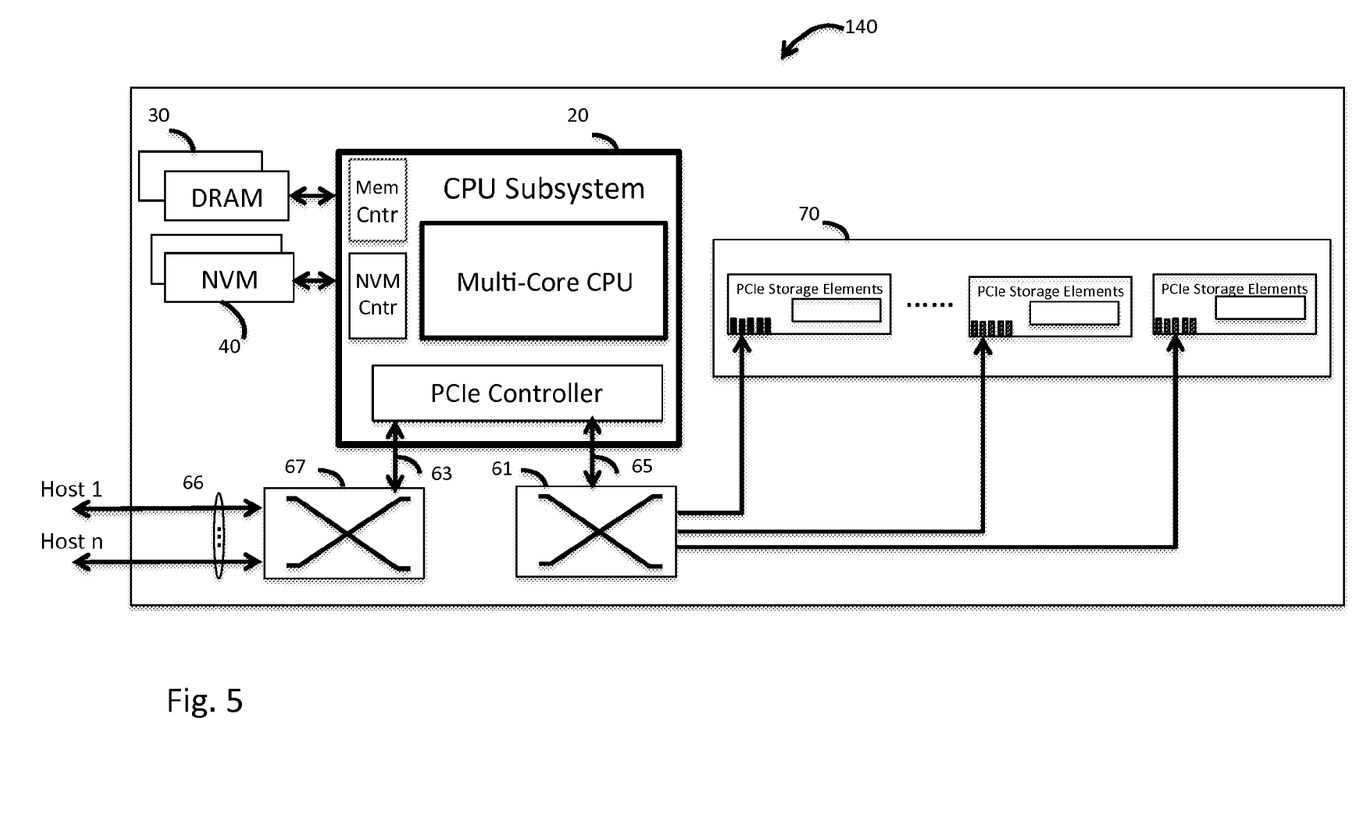
FIG. 5 shows a storage system 140, in accordance with another embodiment of the invention.

FIG. 5 shows a shared PCIe based storage system 140, in accordance with yet another embodiment of the invention. The shared PCIe based storage system 130 is analogous to the storage system 140 with the exception of the host 1 through host n shown coupled to the PCIe controller 28 of the CPU subsystem 20 though PCIe switch 67 via the PCIe bus 63. In this embodiment, PCIe switch 67 is used to extend the PCIe ports and PCIe lanes of PCIe controller 28.

The embodiment of FIG. 5 allows host 1 through host 'n' to be directly connected to the storage system 140 therefore eliminating the need for an external expensive high speed PCIe switch. Integrating the PCIe switch into the storage system will improve the storage rack utilization and cost associated with implementing optimized data centers.

Figure 6:
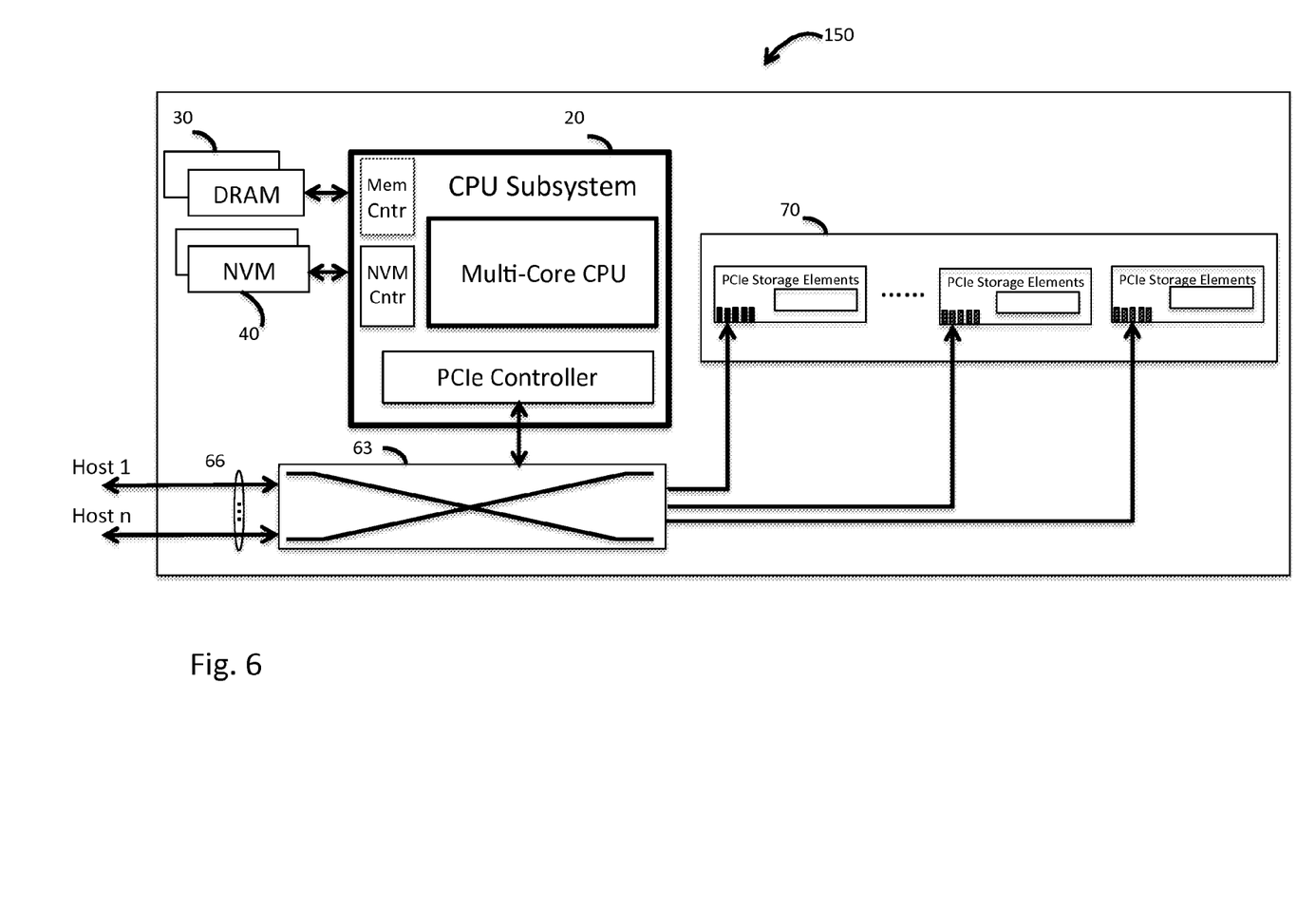
FIG. 6 shows a storage system 150, in accordance with another embodiment of the invention.

FIG. 6a shows shared PCIe based storage system 150, in accordance with another embodiment of the invention. Shared PCIe based storage system 150 is analogous to the storage system 140 with the exception of the PCIe switches. Shared PCIe based storage system 140 is shown to have two PCIe switches 67 and 61 whereas the shared PCIe based storage system 150 integrates the two switches into a single PCIe switch 63.

Figure 7:
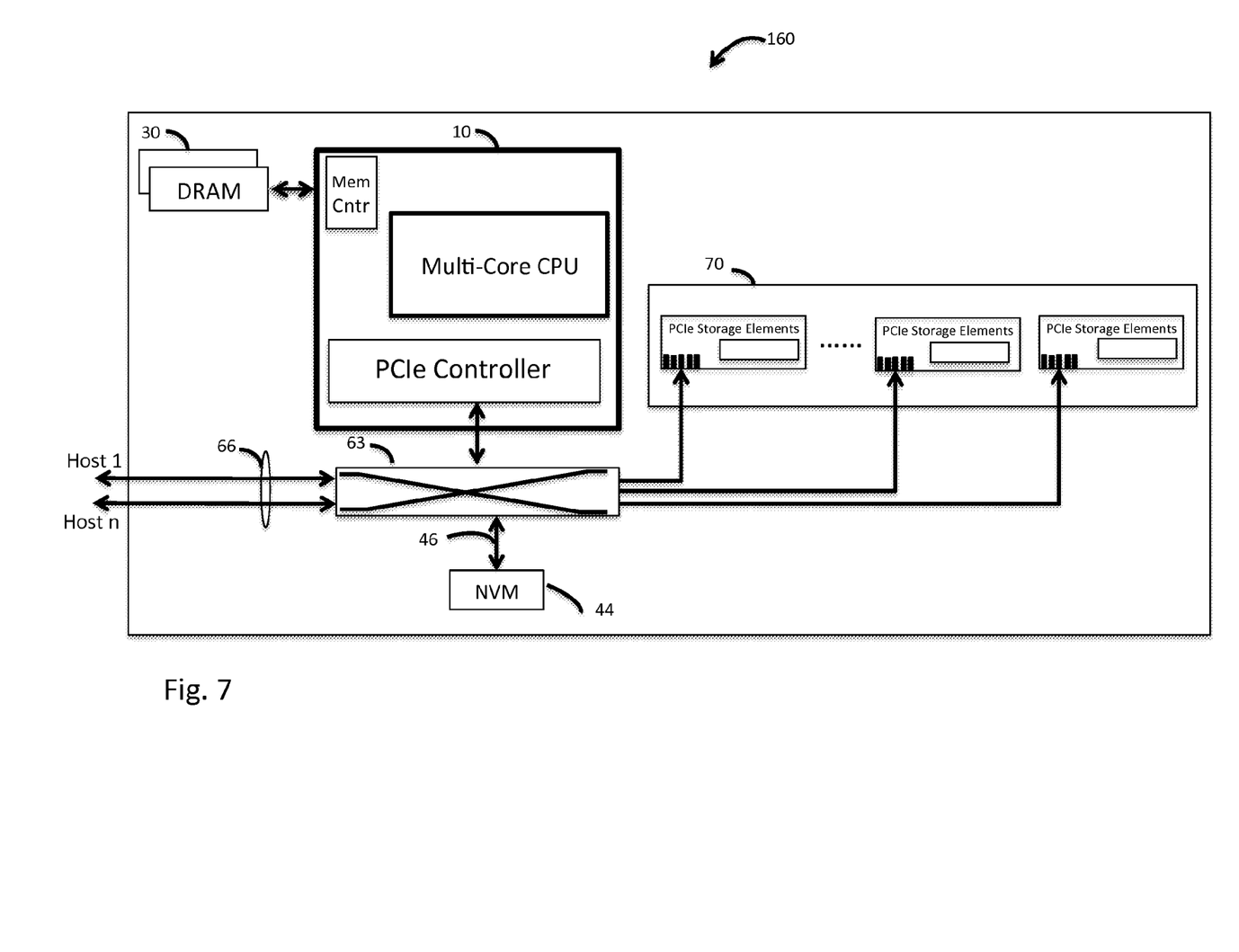
FIG. 7 shows a storage system 160, in accordance with another embodiment of the invention.

FIG. 7 shows a storage system 160, in accordance with another embodiment of the invention. Storage system 160 is analogous to the storage system 150 of FIG. 6 with the exception of the NVM module. In the storage system 150 of FIG. 6, the NVM module 40 is shown coupled directly to the CPU subsystem 20 whereas in the storage system 160 of FIG. 7, the NVM module 42 is shown coupled to the CPU subsystem 10 through a PCIe switch 63.

Figure 8:
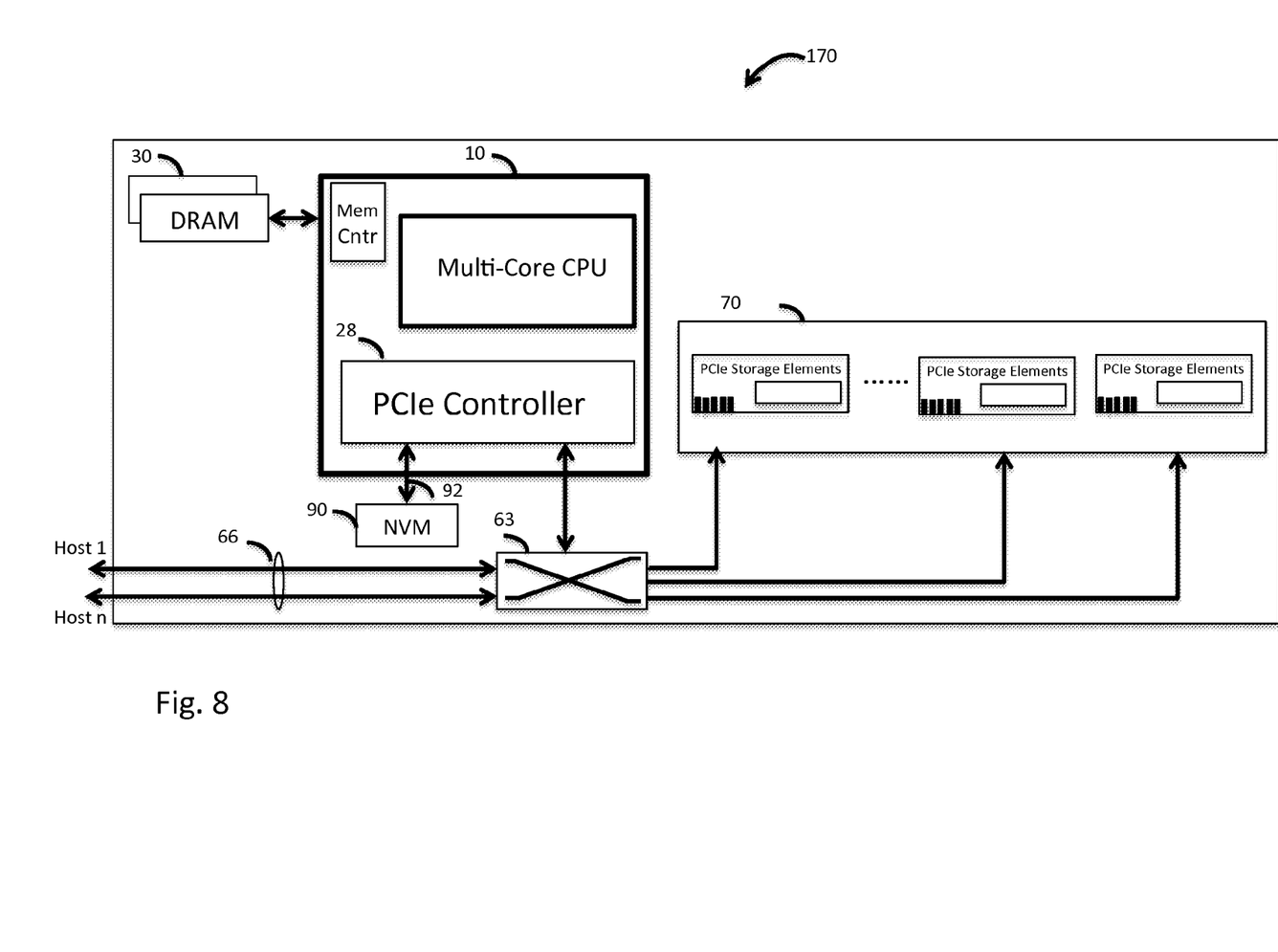
FIG. 8 shows a storage system 170, in accordance with yet another embodiment of the invention.

FIG. 8 shows a storage system 170, in accordance with another embodiment of the invention. The storage system 170 is analogous to the storage system 150 of FIG. 6 and the storage system 160 with the exception of the NVM module in that in the storage system 160 of FIG. 7, the NVM module 44 is shown coupled to the PCIe controller 28 through a PCIe switch 63 whereas in the storage system 170 of FIG. 8, the NVM module 90 is shown coupled directly to the PCIe controller 28 of the CPU 10 through the PCIe bus 92.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A storage system comprising:
a central processing unit (CPU) subsystem including a CPU;
a bank of physically-addressed solid state disks (paSSDs), each of the paSSDs of the bank of paSSDs including a bank of flash memories and addressable using physical addresses associated with user data and provided by the CPU, the user data to be stored in or retrieved from the paSSDs in blocks;
a non-volatile memory module, located externally to the bank of paSSDs, and coupled to the CPU subsystem and including flash tables used to manage blocks in the physically addressed bank of flash memories SSD, the flash tables including tables used to map logical addresses to the physical addresses, the physical addresses for identifying the location of stored user data in the bank of flash memories of the bank of physically addressed paSSDs in blocks;
a peripheral component interconnect express (PCIe) switch coupled to the CPU subsystem through a first PCIe bus and the bank of paSSDs through a plurality of second PCIe buses, the PCIe switch causing independent communication between the bank of paSSDs and the CPU subsystem; and
a network interface controller coupled through a third PCIe bus to the PCIe switch and responsive to the user data and the logical addresses,
wherein the first and second PCIe buses have different numbers of ports.

2. The storage system, as recited in claim 1, wherein the bank of flash memories made of flash NAND memory.

3. The storage system, as recited in claim 1, wherein the non-volatile memory module includes MRAM.

4. The storage system, as recited in claim 1, wherein the non-volatile memory module includes STTMRAM.

5. The storage system, as recited in claim 1, wherein the non-volatile memory module is coupled to the CPU subsystem through a NV memory channel.

6. The storage system, as recited in claim 5, wherein the NV memory channel is a DRAM memory channel.

7. The storage system, as recited in claim 1, further including a system memory coupled to the CPU subsystem and configured to store a software driver for managing the flash tables.

8. The storage system, as recited in claim 1, wherein the non-volatile memory module includes a cache for caching the user data.

9. The storage system, as recited in claim 1, wherein the non-volatile memory module is configured to store a journal for logging changes to the stored user data before committing the changes.

10. The storage system, as recited in claim 1, further including a network switch coupled to the network interface controller coupling one or more hosts to the network interface controller, the one or more hosts operable to communicate the user data and the logical address through the network switch.

11. The storage system, as recited in claim 1, wherein the non-volatile memory is coupled to the CPU subsystem through the PCIe switch.

12. A storage system comprising:
a central processing unit (CPU) subsystem including a CPU;
a bank of physically-addressed solid state disks (paSSDs), each of the paSSDs of the bank of paSSDs including a bank of flash memories and addressable using physical addresses associated with user data provided by the CPU, the user data to be stored in or retrieved from the paSSDs in blocks;
a non-volatile memory module located externally to the bank of paSSDs and coupled to the CPU subsystem and including flash tables used to manage blocks in the bank of flash memories, the flash tables used to map logical addresses to the physical addresses, the physical addresses identifying the location of stored user data in the bank of flash memories of the bank of paSSDs in blocks; and
a peripheral component interconnect express (PCIe) switch coupled to the CPU subsystem through a first PCIe bus and the bank of paSSDs through a plurality of second PCIe buses, the PCIe switch causing independent communication between the bank of paSSDs and the CPU subsystem,
wherein the first and second PCIe buses have different numbers of ports.

13. The storage system, as recited in claim 12, wherein the CPU subsystem includes a PCIe controller and a plurality of hosts are coupled to the PCIe controller.

14. The storage system, as recited in claim 13, wherein the CPU subsystem includes a PCIe controller and a plurality of hosts are coupled to the PCIe controller through the PCIe switch.

15. The storage system, as recited in claim 12, wherein the CPU subsystem includes a PCIe controller and the non-volatile memory is coupled to the PCIe controller.

16. The storage system, as recited in claim 15, wherein the non-volatile memory is coupled to the PCIe controller through the PCIe switch.

17. The storage system, as recited in claim 12, wherein the bank of flash memories is made of flash NAND memory.

18. The storage system, as recited in claim 12, wherein the non-volatile memory module includes MRAM.

19. The storage system, as recited in claim 12, wherein the non-volatile memory module includes STTMRAM.

20. The storage system, as recited in claim 19, wherein the non-volatile memory module is coupled to the CPU subsystem through a NV memory channel.

21. The storage system, as recited in claim 20, wherein the NV memory channel is a DRAM memory channel.

22. The storage system, as recited in claim 12, further including a system memory coupled to the CPU subsystem and configured to store a software driver for managing the flash tables.

23. The storage system, as recited in claim 12, wherein the non-volatile memory module includes a cache for caching the user data.

24. The storage system, as recited in claim 12, wherein the non-volatile memory module is configured to store a journal for logging changes to the user data before committing the changes.

25. A storage system comprising:
- a central processing unit (CPU) subsystem including a CPU;
- a bank of physically-addressed solid state disks (paSSDs), each of the paSSDs of the bank of paSSDs including a bank of flash memories and addressable using physical addresses associated with user data provided by the CPU, the user data to be stored in or retrieved from the physically-addressed SSDs in blocks;
- a non-volatile memory module, located externally to the bank of paSSDs, including flash tables used to manage blocks in the bank of flash memories, the flash tables including tables used to map logical addresses to physical addresses, the physical addresses for identifying the location of stored user data in the bank of flash memories of the bank of paSSDs in blocks; and
- a peripheral component interconnect express (PCIe) switch coupled to the CPU subsystem through a first PCIe bus and the non-volatile memory module and the bank of paSSDs through a plurality of second PCIe buses, the PCIe switch causing independent communication between the bank of paSSDs and the CPU subsystem,
- wherein the first and second PCIe buses have different numbers of ports.

* * * * *